US011025708B1

(12) United States Patent
Singh et al.

(10) Patent No.: US 11,025,708 B1
(45) Date of Patent: Jun. 1, 2021

(54) GROUP LOAD BALANCING FOR VIRTUAL ROUTER REDUNDANCY

(71) Applicant: Juniper Networks, Inc., Sunnyvale, CA (US)

(72) Inventors: Vishal Singh, Nashua, NH (US); Vinay Kumar Tripathi, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/813,574

(22) Filed: Mar. 9, 2020

(51) Int. Cl.
*H04L 29/08* (2006.01)
*H04L 12/713* (2013.01)

(52) U.S. Cl.
CPC ........ *H04L 67/1004* (2013.01); *H04L 45/586* (2013.01)

(58) Field of Classification Search
None
See application file for complete search history.

(56) References Cited

U.S. PATENT DOCUMENTS

| 10,033,667 | B1 | 7/2018 | Ghosh |
| 10,382,329 | B1 | 8/2019 | Reji |
| 2018/0054391 | A1* | 2/2018 | Jain ..................... H04L 12/4641 |

OTHER PUBLICATIONS

RFC 5798 (Nadas, S. editor. Internet Engineering Task Force. "Virtual Router Redundancy Protocol Version 3 for IPv4 and IPv6." Mar. 2010. 40 pages (Year: 2010).*

S. Nadas, Ed., "Virtual Router Redundancy Protocol (VRRP) Version 3 for IPv4 and IPv6," *Request for Comments 5798* (Internet Engineering Task Force, Mar. 2010).

Extended European Search Report to corresponding European Patent Application No. 20177699.4-1215, dated Aug. 21, 2020 (10 pgs.).

* cited by examiner

*Primary Examiner* — Jeffrey R Swearingen
(74) *Attorney, Agent, or Firm* — John C. Pokotylo; Pokotylo Patent Services

(57) ABSTRACT

Load balancing in a network section implementing VRRPv3 may be supported in a way that is easier to implement than that described in § 4.2 of RFC 5798. This may be done by (a) receiving, by a virtual router redundancy protocol (VRRP) router on a local area network (LAN), a group load balancing identifier (GLB ID) value; (b) sending, by the VRRP router, the GLB ID value to at least one peer VRRP router on the LAN, the VRRP router and the at least one peer VRRP router on the LAN defining a group of peer VRRP routers; and (c) responsive to receiving, by the VRRP router, a GLB ID value from a peer VRRP router on the LAN, (1) selecting a master for the group of peer VRRP routers, and (2) responsive to the VRRP router selecting itself as the master for the group of VRRP routers, (A) adjusting, by the VRRP router, a priority value of the VRRP router for the group of VRRP routers, and (B) sending, by the VRRP router, a notification to the at least one VRRP peer device, that the VRRP router is the master for the group of VRRP routers.

18 Claims, 11 Drawing Sheets

GROUP LOAD BALANCING FOR VIRTUAL ROUTER REDUNDANCY

§ 1. BACKGROUND OF THE INVENTION

§ 1.1 Field of the Invention

The present description concerns communications networks. More specifically, the present description concerns improvements for communications networks implementing redundancy using virtual routers.

§ 1.2 Background Information

Although the virtual router redundancy protocol (VRRP) is well understood by those skilled in the art, it is introduced below for the reader's convenience.

§ 1.2.1 Virtual Router Redundancy Protocol (Vrrp)

The document S. Nadas, Ed., "Virtual Router Redundancy Protocol (VRRP) Version 3 for IPv4 and IPv6," Request for Comments 5798 (Internet Engineering Task Force, March 2010)(referred to as "RFC 5798" and incorporated herein by reference) specifies an election protocol that dynamically assigns responsibility for a virtual router to one of the VRRP routers on a local area network (LAN). The VRRP router controlling Internet Protocol-version 4 (IPv4) or Internet Protocol-version 6 (IPv6) address(es) associated with a virtual router is called the "Master," and the Master router forwards packets sent to these IPv4 or IPv6 addresses. (Note that IPvX can mean either IPv4 or IPv6.) VRRP Master routers are configured with virtual IPv4 or IPv6 addresses, and VRRP "Backup" routers infer the address family of the virtual addresses being carried based on the transport protocol. Within a VRRP router, the virtual routers in each of the IPv4 and IPv6 address families are a domain unto themselves and do not overlap.

The process for electing a Master router provides dynamic failover in the forwarding responsibility should the Master become unavailable.

For IPv4, the advantage gained from using VRRP is a higher-availability default path without requiring configuration of dynamic routing or router discovery protocols on every end-host. For IPv6, the advantage gained from using VRRP for IPv6 is a quicker switchover to backup routers than can be obtained with standard IPv6 Neighbor Discovery mechanisms.

§ 1.2.1.1 VRRP for Ipv4

There are a number of methods that an IPv4 end-host can use to determine its first-hop router towards a particular IPv4 destination. These include running (or snooping) a dynamic routing protocol such as Routing Information Protocol (See, e.g., the document, G. Malkin, "RIP Version 2," Request for Comments 2453 (Internet Engineering Task Force, November 1998)(referred to as "RFC 2453" and incorporated herein by reference).) or Open Shortest Path First (OSPF) version 2 (See, e.g., the document, J. Moy, "OSPF Version 2," Request for Comments 2328 (Internet Engineering Task Force, April 1998)(referred to as "RFC 2328" and incorporated herein by reference).), running an ICMP router discovery client (See, e.g., the document, S. Deering, Editor, "ICMP Router Discovery Messages." Request for Comments 1256 (Internet Engineering Task Force, September 1991)(referred to as "RFC 1256" and incorporated herein by reference).), or using a statically configured default route. Problems with these methods are addressed below.

Running a dynamic routing protocol on every end-host may be infeasible for a number of reasons, including administrative overhead, processing overhead, security issues, or lack of a protocol implementation for some platforms. Neighbor or router discovery protocols may require active participation by all hosts on a network, leading to large timer values to reduce protocol overhead in the face of large numbers of hosts. This can result in a significant delay in the detection of a lost (i.e., dead) neighbor; such a delay may introduce unacceptably long "black hole" periods.

The use of a statically configured default route is quite popular; it minimizes configuration and processing overhead on the end-host and is supported by virtually every IPv4 implementation. This mode of operation is likely to persist as dynamic host configuration protocols (See, e.g., the document, R. Droms, "Dynamic Host Configuration Protocol," Request for Comments 2131 (Internet Engineering Task Force, March 1997)(referred to as "RFC 2131" and incorporated herein by reference).) are deployed, which typically provide configuration for an end-host IPv4 address and default gateway. However, this creates a single point of failure. Loss of the default router results in a catastrophic event, isolating all end-hosts that are unable to detect any alternate path that may be available.

The Virtual Router Redundancy Protocol (VRRP) is designed to eliminate the single point of failure inherent in the static default routed environment. VRRP specifies an election protocol that dynamically assigns responsibility for a virtual router to one of the VRRP routers on a LAN. The VRRP router controlling the IPv4 address(es) associated with a virtual router is called the Master and forwards packets sent to these IPv4 addresses. The election process provides dynamic failover in the forwarding responsibility to a Backup should the Master become unavailable. Any of the virtual router's IPv4 addresses on a LAN can then be used as the default first hop router by end-hosts. The advantage gained from using VRRP is a higher availability default path without requiring configuration of dynamic routing or router discovery protocols on every end-host.

§ 1.2.1.2 VRRP FOR IPv6

IPv6 hosts on a LAN will usually learn about one or more default routers by receiving Router Advertisements sent using the IPv6 Neighbor Discovery (ND) protocol (See, e.g., the document, T. Narten, et al, "Neighbor Discovery for IP version 6 (IPv6)," Request for Comments 4861 (Internet Engineering Task Force, September 2007)(referred to as "RFC 4861" and incorporated herein by reference).) The Router Advertisements are multicast periodically at a rate that the hosts will learn about the default routers in a few minutes. They are not sent frequently enough to rely on the absence of the Router Advertisement to detect router failures. Neighbor Discovery (ND) includes a mechanism called Neighbor Unreachability Detection to detect the failure of a neighbor node (router or host) or the forwarding path to a neighbor. This is done by sending unicast ND Neighbor Solicitation messages to the neighbor node. To reduce the overhead of sending Neighbor Solicitations, they are only sent to neighbors to which the node is actively sending traffic and only after there has been no positive indication that the router is up for a period of time. Using the default parameters in ND, it will take a host about 38 seconds to learn that a router is unreachable before it will switch to another default router. This delay would be very noticeable to users and cause some transport protocol implementations to time out. While the ND unreachability detection could be made quicker by changing the parameters to be more aggressive (note that the current lower limit for this is 5 seconds), this would have the downside of significantly increasing the overhead of ND traffic, especially when there are many hosts all trying to determine the reachability of one of more routers.

The Virtual Router Redundancy Protocol for IPv6 provides a much faster switchover to an alternate default router than can be obtained using standard ND procedures. Using VRRP, a Backup router can take over for a failed default router in around three seconds (using VRRP default parameters). This is done without any interaction with the hosts and a minimum amount of VRRP traffic.

§ 1.2.1.3 VRRP Overview

VRRP specifies an election protocol to provide virtual router functions. VRRP messaging is performed using either IPv4 or IPv6 multicast datagrams. Thus, VRRP can operate over a variety of multiaccess LAN technologies supporting IPvX multicast. Each link of a VRRP virtual router has a single well-known MAC address (e.g., an IEEE 802 48-bit MAC address) allocated to it. The virtual router MAC address is used as the source in all periodic VRRP messages sent by the Master router to enable bridge learning in an extended LAN.

A virtual router is defined by its virtual router identifier (VRID) and a set of either IPv4 or IPv6 address(es). A VRRP router may associate a virtual router with its real address on an interface. The scope of each virtual router is restricted to a single LAN. A VRRP router may be configured with additional virtual router mappings and priority for virtual routers it is willing to back up. The mapping between the VRID and its IPvX address(es) is to be coordinated among all VRRP routers on a LAN.

There is no restriction against reusing a VRID with a different address mapping on different LANs, nor is there a restriction against using the same VRID number for a set of IPv4 addresses and a set of IPv6 addresses; however, these are two different virtual routers.

To minimize network traffic, only the Master for each virtual router sends periodic VRRP Advertisement messages. A Backup router will not attempt to preempt the Master unless it has higher priority. This eliminates service disruptions, unless a more preferred path becomes available. It's also possible to administratively prohibit all preemption attempts. The only exception is that a VRRP router will always become Master of any virtual router associated with addresses it owns. If the Master becomes unavailable, then the highest priority Backup will transition to become the Master after a short delay, thereby providing a controlled transition of the virtual router responsibility with minimal service interruption.

The VRRP protocol design provides rapid transition from (previous) Backup to (new) Master to reduce or minimize service interruption, and incorporates optimizations that reduce protocol complexity while guaranteeing controlled Master transition for typical operational scenarios. The optimizations result in an election protocol with minimal runtime state requirements, minimal active protocol states, and a single message type and sender. The typical operational scenarios are defined to be two redundant routers and/or distinct path preferences among each router. A side effect when these assumptions are violated (i.e., more than two redundant paths, all with equal preference) is that duplicate packets may be forwarded for a brief period during Master election. However, the typical scenario assumptions are likely to cover the vast majority of deployments, loss of the Master router is infrequent, and the expected duration in Master election convergence is quite small (<<1 second). Thus, the VRRP optimizations represent significant simplifications in the protocol design while incurring an insignificant probability of brief network degradation.

§ 1.2.2 Limitations of VRRPv3

As should be appreciated from the foregoing, VRRP and VRRPv3 are used to provide router redundancy in a network. Only one router acts as the Master, The remaining router(s) may act as a backup(s). This mechanism has following drawbacks. For example, referring to FIG. 1, routers 1-3 and VLAN10, VLAN20 and VLAN30 are connected to switch. Router 1 has a VRRP priority of 200, router 2 has a VRRP priority of 100 and router 3 also has a VRRP priority of 100 for all VLANs. Since router 1 has the highest VRRP priority, it serves as the master for all of the VLANs—VLAN10, VLAN20 and VLAN30. This is unfortunate since routers 2 and 3 may have available capacity that is not used by any of the VLANs.

Many contemporary L2 protocols (e.g., EVPN, MCLAG) that provide router redundancy, also provide a built-in mechanism for active-active forwarding to avoid wasting network resources. Unfortunately, however, VRRP/VRRPv3 doesn't provide any kind of in-built automated mechanism for traffic load balancing. Unfortunately, such a lack of automated load balancing may result in sub-optimal use of network resources.

Network operators can configure the VRRP routers manually, using VRRP groups and priorities such that traffic load is distributed among the VRRP routers, as different routers can act as masters for different VRRP groups. For example, section 4.2 of RFC 5798 illustrates an example configuration with the hosts splitting their traffic between two virtual routers. This configuration is reproduced in FIG. 2. A first router (RTR1) is the Master for VRID=1 and Backup for VRID=2, and has address IPvX A. A second router (RTR2) is the Mater for VRID=2 and Backup for VRID=1, and has address IPvX B.

In the IPv4 example of FIG. 2 (that is, IPvX is IPv4 everywhere in FIG. 2), half of the hosts have configured a static route through RTR1's IPv4 A, and half are using RTR2's IPv4 B. Virtual router VRID=1 is configured to cover IPvX address A. This configured network section demonstrates a deployment providing load splitting when both routers are available, while also providing full redundancy for robustness.

In the IPv6 example of FIG. 2 (that is, IPvX is IPv6 everywhere in FIG. 2), half of the hosts have learned a default route through RTR1's IPv6 A, and half are using RTR2's IPv6 B. In this case, RTR2 will assert itself as Master for VRID=2 while RTR1 will act as a Backup. This scenario demonstrates a deployment providing load splitting when both routers are available, while providing full redundancy for robustness.

Unfortunately, a configuration such as that illustrated in FIG. 2 and described in section 4.2 of RFC 5798 requires careful planning, skillful implementation, and re-optimization. Therefore, it would be useful to support load balancing in a network section implementing VRRP, in a way that is easier to implement.

§ 2. SUMMARY OF THE INVENTION

Example embodiments consistent with the present description support load balancing in a network section implementing VRRPv3, in a way that is easier to implement than that described in § 4.2 of RFC 5798. Such example embodiments may do so by (a) receiving, by a virtual router redundancy protocol (VRRP) router on a local area network (LAN), a group load balancing identifier (GLB ID) value;

(b) sending, by the VRRP router, the GLB ID value to at least one peer VRRP router on the LAN, the VRRP router and the at least one peer VRRP router on the LAN defining a group of peer VRRP routers; and (c) responsive to receiving, by the VRRP router, a GLB ID value from a peer VRRP router on the LAN, (1) selecting a master for the group of peer VRRP routers, and (2) responsive to the VRRP router selecting itself as the master for the group of VRRP routers, (A) adjusting, by the VRRP router, a priority value of the VRRP router for the group of VRRP routers, and (B) sending, by the VRRP router, a notification to the at least one VRRP peer device, that the VRRP router is the master for the group of VRRP routers. This method may be performed by the VRRP router. This method may be provided as program instruction stored on a non-transitory computer-readable storage medium.

In some example methods, the GLB ID is a value between 1 and 15.

In some example methods, the GLB ID is sent in a VRRPv3 formatted packet. For example, the GLB ID may be represented by bits in the RSVD field of the VRRPv3 formatted packet.

In some example methods, the act of adjusting, by the VRRP router, a priority value of the VRRP router for the group of VRRP routers, includes increasing the priority value (e.g., to a maximum value).

§ 3. BRIEF DESCRIPTION OF THE DRAWINGS

§ 4. DETAILED DESCRIPTION

The present disclosure may involve novel methods, apparatus, message formats, and/or data structures for supporting load balancing in a network section implementing VRRP. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 Example Methods

Figure 3:
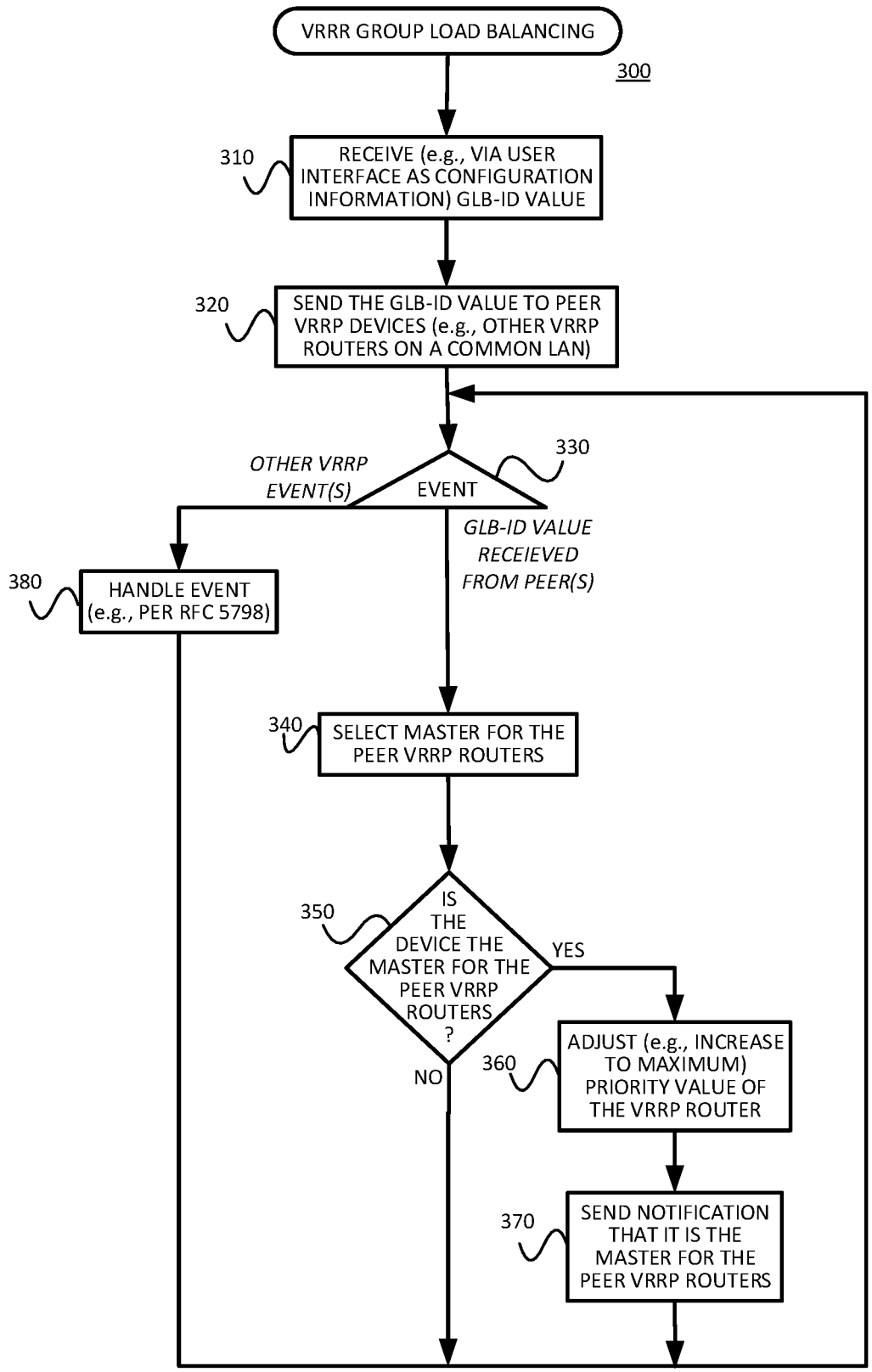
FIG. 3 is a flow diagram of an example method for supporting load balancing in a network section implementing VRRP, in a manner consistent with the present description.

FIG. 3 is a flow diagram of a first example method 300 for supporting load balancing in a network section implementing VRRP (e.g., VRRPv3). The example method 300 receives (e.g., via a user interface, as configuration information) a group load balancing identifier (GLB-ID) value. (Block 310) This group load balancing identifier value is sent to peer VRRP devices (e.g., other VRRP router(s) on a common LAN). (Block 320) Different branches of the example method 300 are performed responsive to the occurrence of different events. (Event branch point 330) For example, in the event that a GLB-ID value is received from a peer, the example method 300 selects a master for the group of peer VRRP routers. (Block 340) If the device running the example method 300 is the master for the group of peer VRRP routers (Decision 350=YES), the example method 300 adjusts the priority value (e.g., increases it to a maximum priority value) of the VRRP router running the method 300 (Block 360), and sends a notification that it is the master for the group of peer VRRP routers. (Block 370) (Recall that only the Master sends advertisements in RFC 5798.) If, on the other hand, the device running the example method 300 is not the master for the group of peer VRRP routers (Decision 550=NO), the example method 300 branches back to event branch point 330.

Referring back to event branch point 330, responsive to the occurrence of other VRRP event(s), such event(s) are handled (e.g., per RFC 5798) (Block 380) before the example method 300 branches back to event branch point 330.

Referring back to block 340, different procedures may be used to select the Master for the identified VRRP group. Section 4.5 below describes some possible (though non-limiting) procedures for selecting the Master.

In at least some implantations of the example method 300, basic configuration and implantation is consistent with that proposed in RFC5798.

Since each router may run the example method 300, all the routers in the setup would become aware of the other VRRP routers on a common LAN, their GLB-IDs, and the number of VRRP groups (number of distinct LANs). Given such information, each VRRP router can run a selection procedure to choose the group(s) of peer VRRP routers for which it would become Master. Each VRRP router may do so by adjusting the VRRP priority so that it may become different from the originally configured priority. Routers would start VRRPv3 advertisements with the adjusted priorities to announce themselves as master for some groups.

Note that adding or deleting groups (of distinct LANs to which VRRP routers belong), or adding or deleting VRRPv3 routers, would automatically trigger any necessary adjustments in load balancing. Thus, the example method 300 provides an in-built mechanism for VRRP group load balancing.

Recall from block 320 that the example method sends the received GLB-ID value to its peer VRRP device(s). An example data structure 400 for carrying this value is described in § 4.2 below, with reference to FIG. 4.

§ 4.2 Example Data Structures

Figure 4:
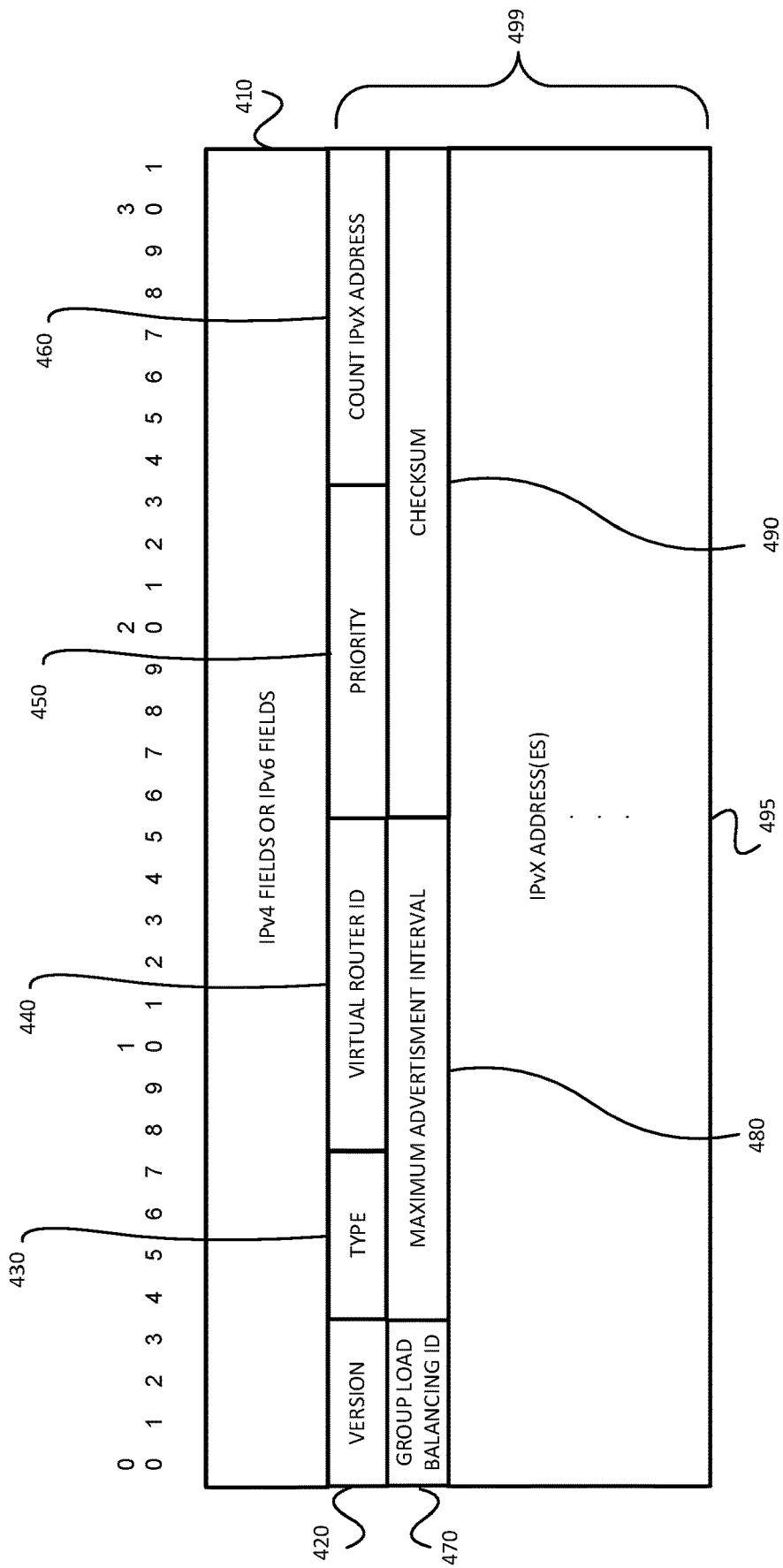
FIG. 4 is an example data structure for carrying a group load balancing (GLB) identifier in a message between routers running a virtual router redundancy protocol, such as VRRPv3 for example.

FIG. 4 is an example data structure 400 for carrying a group load balancing (GLB) identifier in a message between peer routers running a virtual router redundancy protocol (e.g., VRRP routers on a common LAN), such as VRRPv3 for example. The example data structure 400 of FIG. 4 is very similar to the VRRP packet format described in § 5.1 of RFC 5798, but carries the GLB-ID value in the reserved field 470.

More specifically, the IPv4 fields or IPv6 fields 410 may correspond to those described in §§ 5.1.1 and 5.1.2 of RFC 5798. Per section 5.2 of RFC 5798, the VRRP packet section 499 may include a 4-bit Version field 420 (e.g., Version 3), a 4-bit type field 430 (e.g., set to 1, indicating a VRRP Advertisement), an 8-bit VRID field 440 identifying the virtual router which generated and sent the message 400, an 8-bit priority field 450 (which is used to select the master router), an 8-bit count IPvX address field 460 (which specifies the number of IPv4 or IPv6 addresses contained in field 495 of the example message 400), a 4-bit GLB-ID field 470, a 12-bit Maximum Advertisement Interval field 480 (which indicates the time interval (e.g., in centi-seconds) between advertisements), a 16-bit Checksum field 490 (which is used to detect data correction in the message 400), and one or more IPvX addresses associated with the virtual router 495.

Referring back to the 4-bit GLB-ID field 470, a value of 0 may indicate that a non-load balancing mode is to be used, while 15 non-zero values can be used to represent a GLB-ID. Note that the VRID field 440 can't necessarily be double-used for this purpose since it is not, necessarily, unique. (Recall that per RFC 5798, there is no restriction against reusing a VRID with a different address mapping on different LANs, nor is there a restriction against using the same VRID number for a set of IPv4 addresses and a set of IPv6 addresses; however, these are two different virtual routers.) Thus, at least some example embodiments consistent with the present description propose a new GLB-ID configuration, a non-zero numeral value, on each router participating in VRRP (e.g., VRRPv3) setup. This GLB-ID information can be encoded in the RSVD field of the VRRPv3 packet proposed in RFC 5798 and propagated to the other VRRPv3 routers. Once a router receives the non-zero value in RSVD field from other routers, it would become aware that Group Load Balancing needs to be performed among those routers.

§ 4.3 Example Apparatus

Figure 5:
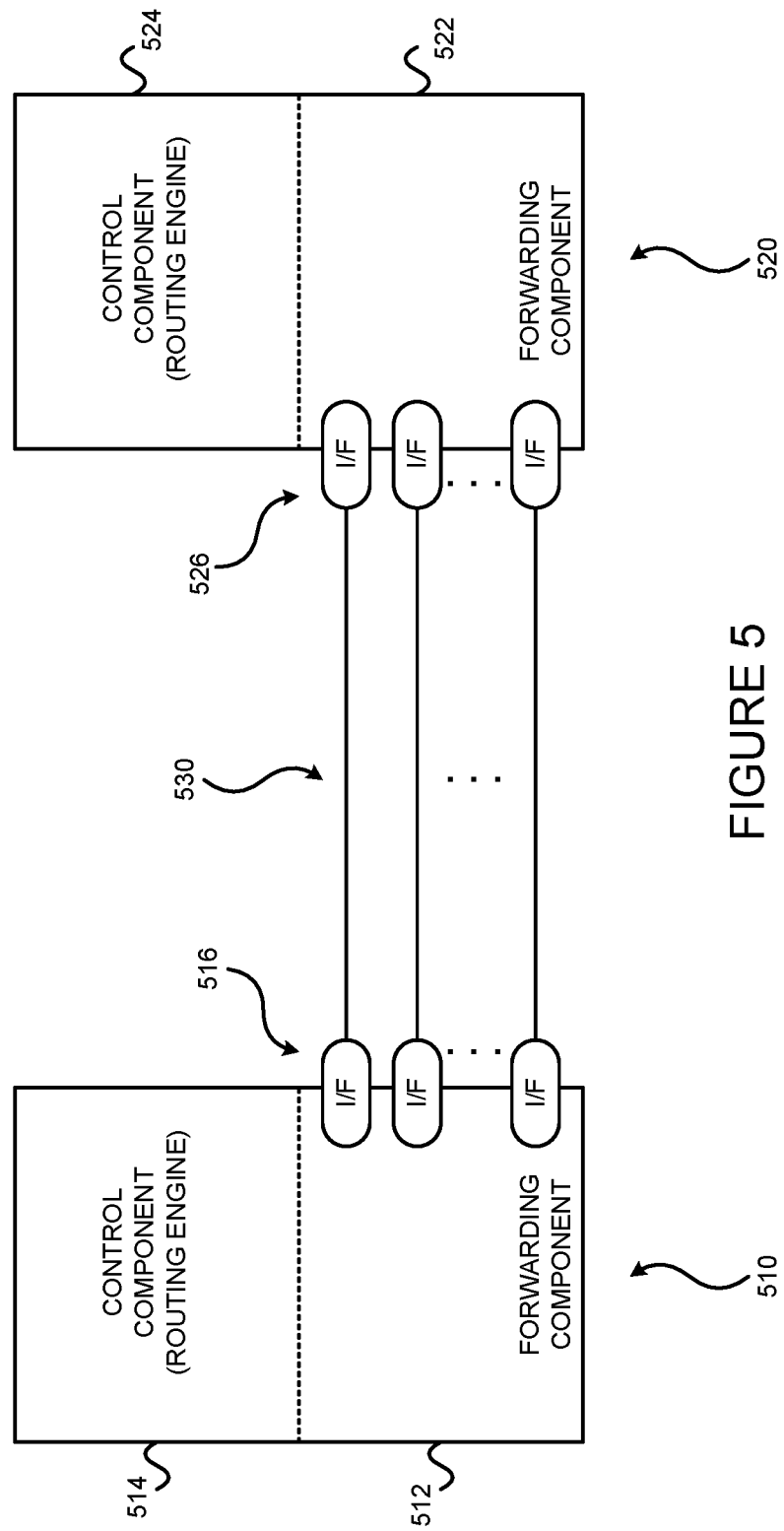
FIG. 5 illustrates two data forwarding systems, which may be used as VRRP peers, coupled via communications links.

FIG. 5 illustrates two data forwarding systems 510 and 520 coupled via communications links 530. The links may be physical links or "wireless" links. The data forwarding systems 510, 520 may be routers for example, and may VRRP peer devices. If the data forwarding systems 510, 520 are example routers, each may include a control component (e.g., a routing engine) 514, 524 and a forwarding component 512, 522. Each data forwarding system 510, 520 includes one or more interfaces 516, 526 that terminate one or more communications links 530. The example method 300 (or instances thereof) may be implemented in the control components 514, 524.

As just discussed above, and referring to FIG. 6, some example routers 600 include a control component (e.g., routing engine) 610 and a packet forwarding component (e.g., a packet forwarding engine) 690.

The control component 610 may include an operating system (OS) kernel 620, routing protocol process(es) 630, label-based forwarding protocol process(es) 640, interface process(es) 650, user interface (e.g., command line interface) process(es) 660, and chassis process(es) 670, and may store routing table(s) 639, label forwarding information 649, and forwarding (e.g., route-based and/or label-based) table(s) 680. As shown, the routing protocol process(es) 630 may support routing protocols such as the routing information protocol ("RIP") 631, the intermediate system-to-intermediate system protocol ("IS-IS") 632, the open shortest path first protocol ("OSPF") 633, the enhanced interior gateway routing protocol ("EIGRP") 634 and the border gateway protocol ("BGP") 635 (and other protocols such as VRRPv3 for example), and the label-based forwarding protocol process(es) 640 may support protocols such as BGP 635, the label distribution protocol ("LDP") 641, the resource reservation protocol ("RSVP") 642, Ethernet virtual private network (EVPN) 643, layer 2 (L2) VPN 644 and segment routing (SR) 645. One or more components (not shown) may permit a user 665 to interact with the user interface process(es) 660. Similarly, one or more components (not shown) may permit an outside device to interact with one or more of the router protocol process(es) 630, the label-based forwarding protocol process(es) 640, the interface process(es) 650, and the chassis process(es) 670, via SNMP 685, and such processes may send information to an outside device via SNMP 685.

The packet forwarding component 690 may include a microkernel 692 over hardware components (e.g., ASICs, switch fabric, optics, etc.) 691, an interface process(es) 693, distributed ASICs 694, a chassis process(es) 695 and a forwarding (e.g., route-based and/or label-based) table(s) 696.

Figure 6:
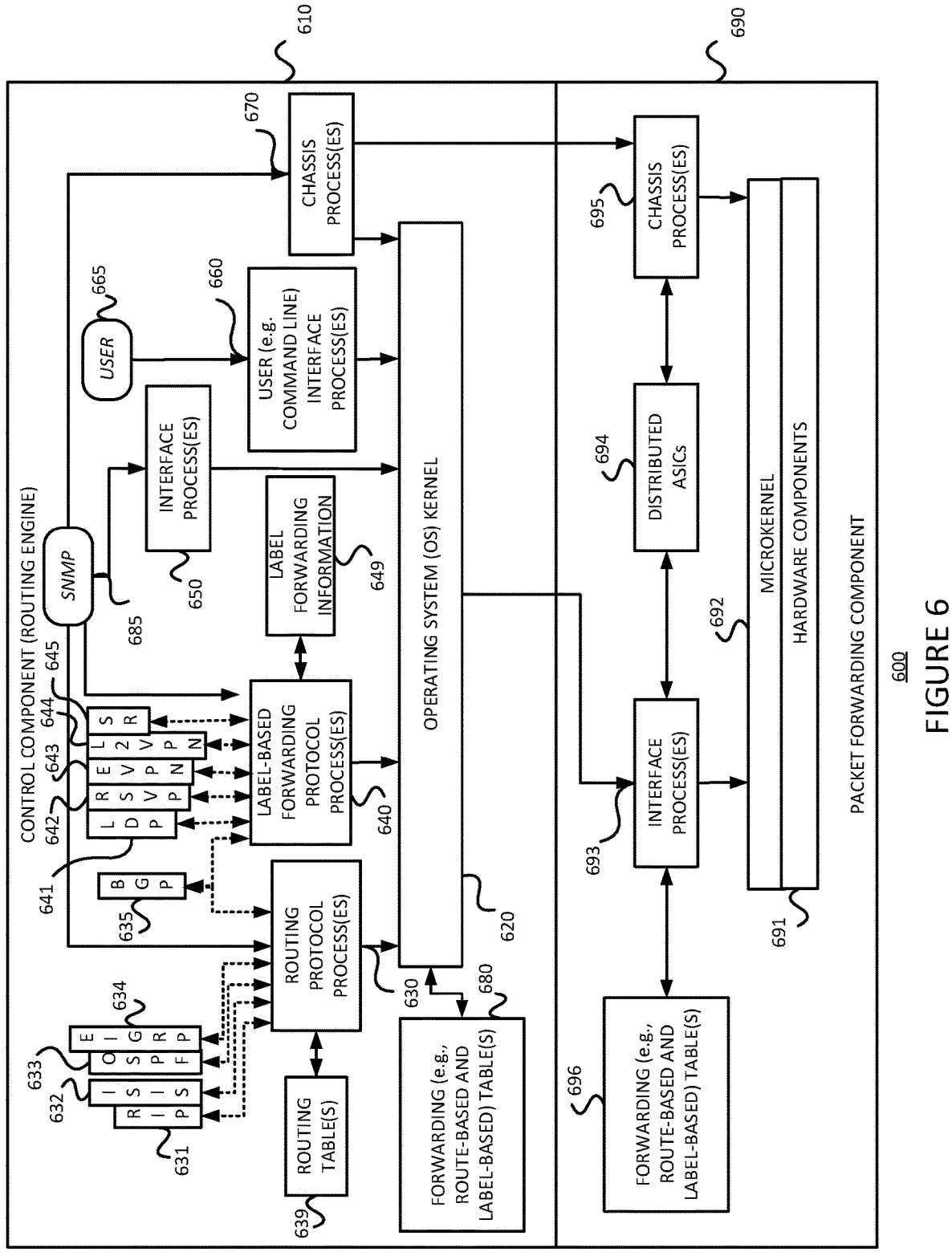
FIG. 6 is a block diagram of a router which may be used as a VRRP peer device.

In the example router 600 of FIG. 6, the control component 610 handles tasks such as performing routing protocols, performing label-based forwarding protocols, control packet processing, etc., which frees the packet forwarding component 690 to forward received packets quickly. That is, received control packets (e.g., routing protocol packets and/or label-based forwarding protocol packets) are not fully processed on the packet forwarding component 690 itself, but are passed to the control component 610, thereby reducing the amount of work that the packet forwarding component 690 has to do and freeing it to process packets to be forwarded efficiently. Thus, the control component 610 is primarily responsible for running routing protocols (such as VRRPv3 for example) and/or label-based forwarding protocols, maintaining the routing tables and/or label forwarding information, sending forwarding table updates to the packet forwarding component 690, and performing system management. The example control component 610 may handle routing protocol packets (such as VRRPv3 for example), provide a management interface, provide configuration management, perform accounting, and provide alarms. The processes 630, 640, 650, 660 and 670 may be modular, and may interact with the OS kernel 620. That is, nearly all of the processes communicate directly with the OS kernel 620. Using modular software that cleanly separates processes from each other isolates problems of a given process so that such problems do not impact other processes that may be running. Additionally, using modular software facilitates easier scaling.

Still referring to FIG. 6, the example OS kernel 620 may incorporate an application programming interface ("API") system for external program calls and scripting capabilities. The control component 610 may be based on an Intel PCI platform running the OS from flash memory, with an alternate copy stored on the router's hard disk. The OS kernel 620 is layered on the Intel PCI platform and establishes communication between the Intel PCI platform and processes of the control component 610. The OS kernel 620 also ensures that the forwarding tables 696 in use by the packet forwarding component 690 are in sync with those 680 in the control component 610. Thus, in addition to providing the underlying infrastructure to control component 610 software processes, the OS kernel 620 also provides a link between the control component 610 and the packet forwarding component 690.

Referring to the routing protocol process(es) 630 of FIG. 6, this process(es) 630 provides routing and routing control functions within the platform. In this example, the RIP 631, ISIS 632, OSPF 633 and EIGRP 634 (and BGP 635) protocols are provided. Naturally, other routing protocols (such as VRRPv3 for example) may be provided in addition, or alternatively. Similarly, the label-based forwarding protocol process(es) 640 provides label forwarding and label control functions. In this example, the LDP 641, RSVP 642, EVPN 643, L2VPN 644 and SR 645 (and BGP 635) protocols are provided. Naturally, other label-based forwarding protocols (e.g., MPLS, etc.) may be provided in addition, or alternatively. In the example router 600, the routing table(s) 639 is produced by the routing protocol process(es) 630, while the label forwarding information 649 is produced by the label-based forwarding protocol process(es) 640. In some example embodiments, the example methods 300 consistent with the present description may be performed by one or more of the routing protocol process(es) 630.

Still referring to FIG. 6, the interface process(es) 650 performs configuration of the physical interfaces and encapsulation.

The example control component 610 may provide several ways to manage the router. For example, it 610 may provide a user interface process(es) 660 which allows a system operator 665 to interact with the system through configuration, modifications, and monitoring. The SNMP 685 allows SNMP-capable systems to communicate with the router platform. This also allows the platform to provide necessary SNMP information to external agents. For example, the SNMP 685 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 610, thereby avoiding slowing traffic forwarding by the packet forwarding component 690.

Although not shown, the example router 600 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 660 via a console port, an auxiliary port, and/or a management Ethernet port.

The packet forwarding component 690 is responsible for properly outputting received packets as quickly as possible. If there is no entry in the forwarding table for a given destination or a given label and the packet forwarding component 690 cannot perform forwarding by itself, it 690 may send the packets bound for that unknown destination off to the control component 610 for processing. The example packet forwarding component 690 is designed to perform Layer 2 and Layer 3 switching, route lookups, and rapid packet forwarding.

As shown in FIG. 6, the example packet forwarding component 690 has an embedded microkernel 692 over hardware components 691, interface process(es) 693, distributed ASICs 694, and chassis process(es) 695, and stores a forwarding (e.g., route-based and/or label-based) table(s) 696. The microkernel 692 interacts with the interface process(es) 693 and the chassis process(es) 695 to monitor and control these functions. The interface process(es) 692 has direct communication with the OS kernel 620 of the control component 610. This communication includes forwarding exception packets and control packets to the control component 610, receiving packets to be forwarded, receiving forwarding table updates, providing information about the health of the packet forwarding component 690 to the control component 610, and permitting configuration of the interfaces from the user interface (e.g., CLI) process(es) 660 of the control component 610. The stored forwarding table(s) 696 is static until a new one is received from the control component 610. The interface process(es) 693 uses the forwarding table(s) 696 to look up next-hop information. The interface process(es) 693 also has direct communication with the distributed ASICs 694. Finally, the chassis process(es) 695 may communicate directly with the microkernel 692 and with the distributed ASICs 694.

Figure 7:
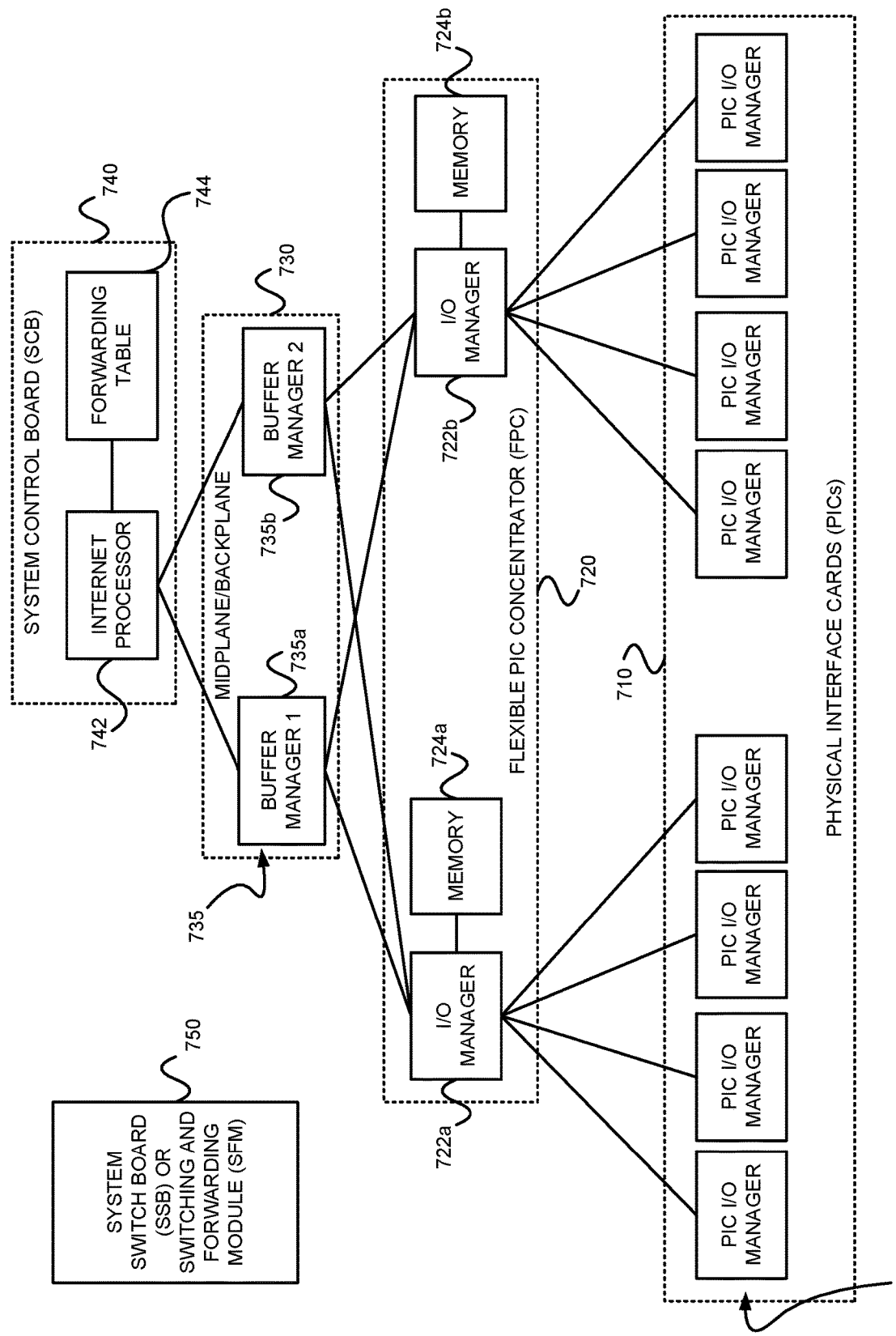
FIG. 7 is an example architecture in which ASICS may be distributed in a packet forwarding component to divide the responsibility of packet forwarding.

FIG. 7 is an example of how the ASICS may be distributed in the packet forwarding component 690 to divide the responsibility of packet forwarding. As shown in FIG. 7, the ASICs of the packet forwarding component 690 may be distributed on physical interface cards ("PICs") 710, flexible PIC concentrators ("FPCs") 720, a midplane or backplane 730, and a system control board(s) 740 (for switching and/or forwarding). Switching fabric is also shown as a system switch board ("SSB"), or a switching and forwarding module ("SFM") 750. Each of the PICs 710 includes one or more PIC I/O managers 715. Each of the FPCs 720 includes one or more I/O managers 722, each with an associated memory 724. The midplane/backplane 730 includes buffer managers 735a, 735b. Finally, the system control board 740 includes an internet processor 742 and an instance of the forwarding table 744. (Recall, e.g., 696 of FIG. 6.)

Still referring to FIG. 7, the PICs 710 contain the interface ports. Each PIC 710 may be plugged into an FPC 720. Each individual PIC 710 may contain an ASIC that handles media-specific functions, such as framing or encapsulation. Some example PICs 710 provide SDH/SONET, ATM, Gigabit Ethernet, Fast Ethernet, and/or DS3/E3 interface ports.

An FPC 720 can contain from one or more PICs 710, and may carry the signals from the PICs 710 to the midplane/backplane 730 as shown in FIG. 7.

The midplane/backplane 730 holds the line cards. The line cards may connect into the midplane/backplane 730 when inserted into the example router's chassis from the front. The control component (e.g., routing engine) 610 may plug into the rear of the midplane/backplane 730 from the rear of the chassis. The midplane/backplane 730 may carry electrical (or optical) signals and power to each line card and to the control component 610.

The system control board 740 may perform forwarding lookup. It 740 may also communicate errors to the routing engine. Further, it 740 may also monitor the condition of the router based on information it receives from sensors. If an abnormal condition is detected, the system control board 740 may immediately notify the control component 610.

Figure 8A:
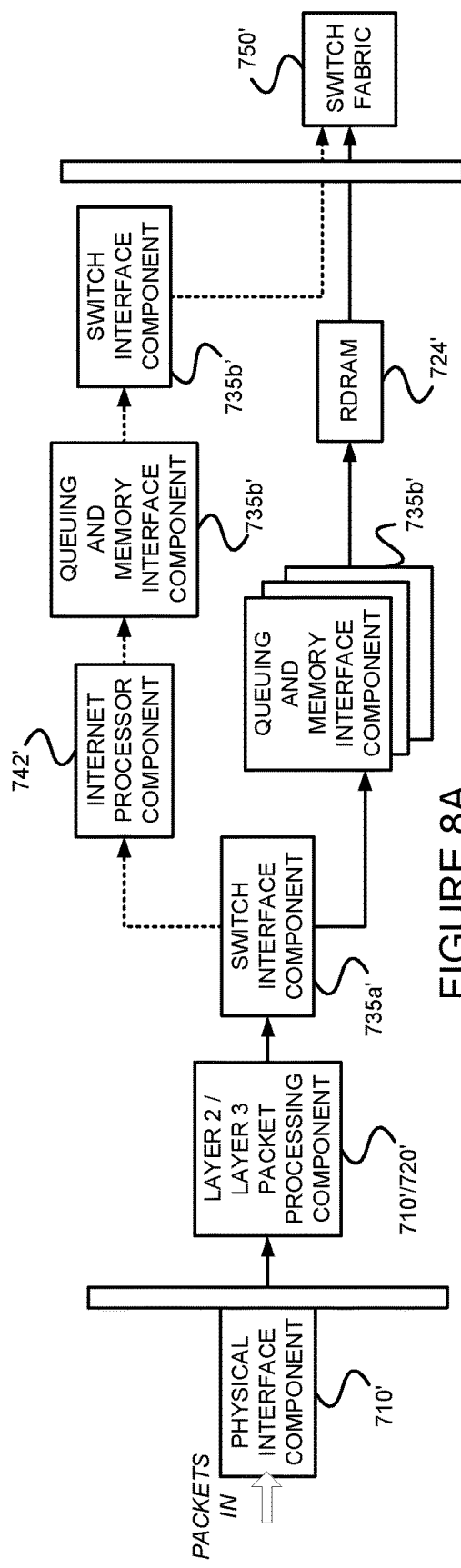
FIGS. 8A and 8B illustrate an example of operations of the example architecture of FIG. 7.
Figure 8B:
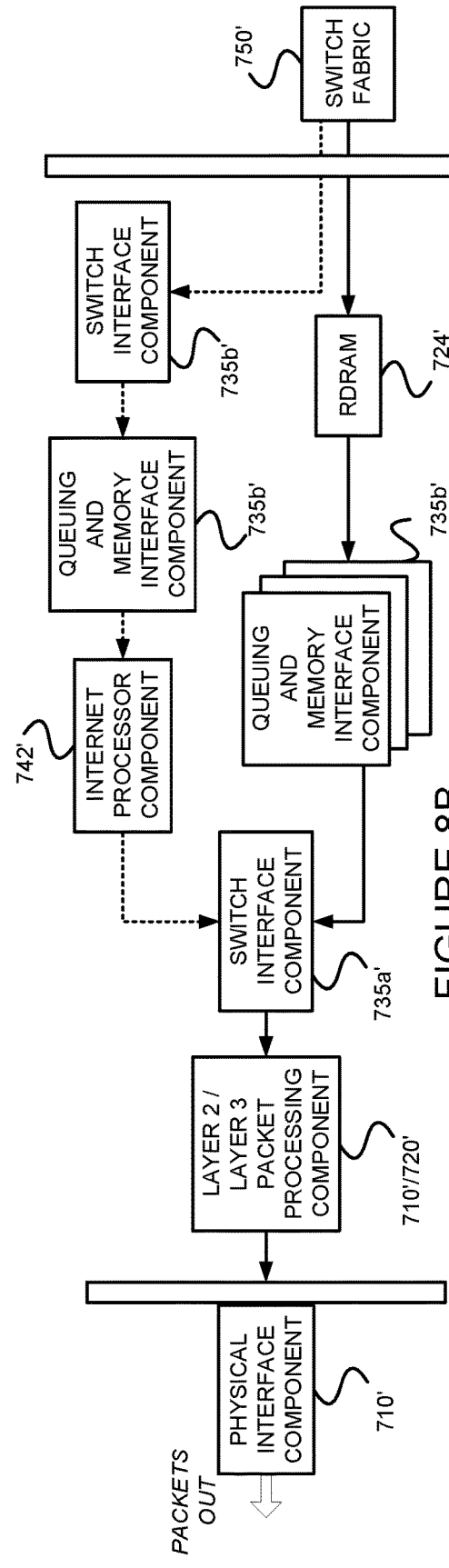

Referring to FIGS. 7, 8A and 8B, in some exemplary routers, each of the PICs 710,710' contains at least one I/O manager ASIC 715 responsible for media-specific tasks, such as encapsulation. The packets pass through these I/O ASICs on their way into and out of the router. The I/O manager ASIC 715 on the PIC 710,710' is responsible for managing the connection to the I/O manager ASIC 722 on the FPC 720,720', managing link-layer framing and creating the bit stream, performing cyclical redundancy checks (CRCs), and detecting link-layer errors and generating alarms, when appropriate. The FPC 720 includes another I/O manager ASIC 722. This ASIC 722 takes the packets from the PICs 710 and breaks them into (e.g., 74-byte) memory blocks. This FPC I/O manager ASIC 722 sends the blocks to a first distributed buffer manager (DBM) 735a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 735a' manages and writes packets to the shared memory 724 across all FPCs 720. In parallel, the first DBM ASIC 735a' also extracts information on the destination of the packet and passes this forwarding-related information to the Internet processor 742/742'. The Internet processor 742/742' performs the route lookup using the forwarding table 744 and sends the information over to a second DBM ASIC 735b'. The Internet processor ASIC 742/742' also collects exception packets (i.e., those without a forwarding table entry) and sends them to the control component 610. The second DBM ASIC 735b' then takes this information and the 74-byte blocks and forwards them to the I/O manager ASIC 722 of the egress FPC 720/720' (or multiple egress FPCs, in the case of multicast) for reassembly. (Thus, the DBM ASICs 735a' and 735b' are responsible for managing the packet memory 724 distributed across all FPCs 720/720', extracting forwarding-related information from packets, and instructing the FPC where to forward packets.)

The I/O manager ASIC 722 on the egress FPC 720/620' may perform some value-added services. In addition to incrementing time to live ("TTL") values and re-encapsulating the packet for handling by the PIC 710, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 722 on the egress FPC 720/720' may be responsible for receiving the blocks from the second DBM ASIC 735b', incrementing TTL values, queuing a pointer to the packet, if necessary, before applying CoS rules, re-encapsulating the blocks, and sending the encapsulated packets to the PIC I/O manager ASIC 715.

Figure 9:
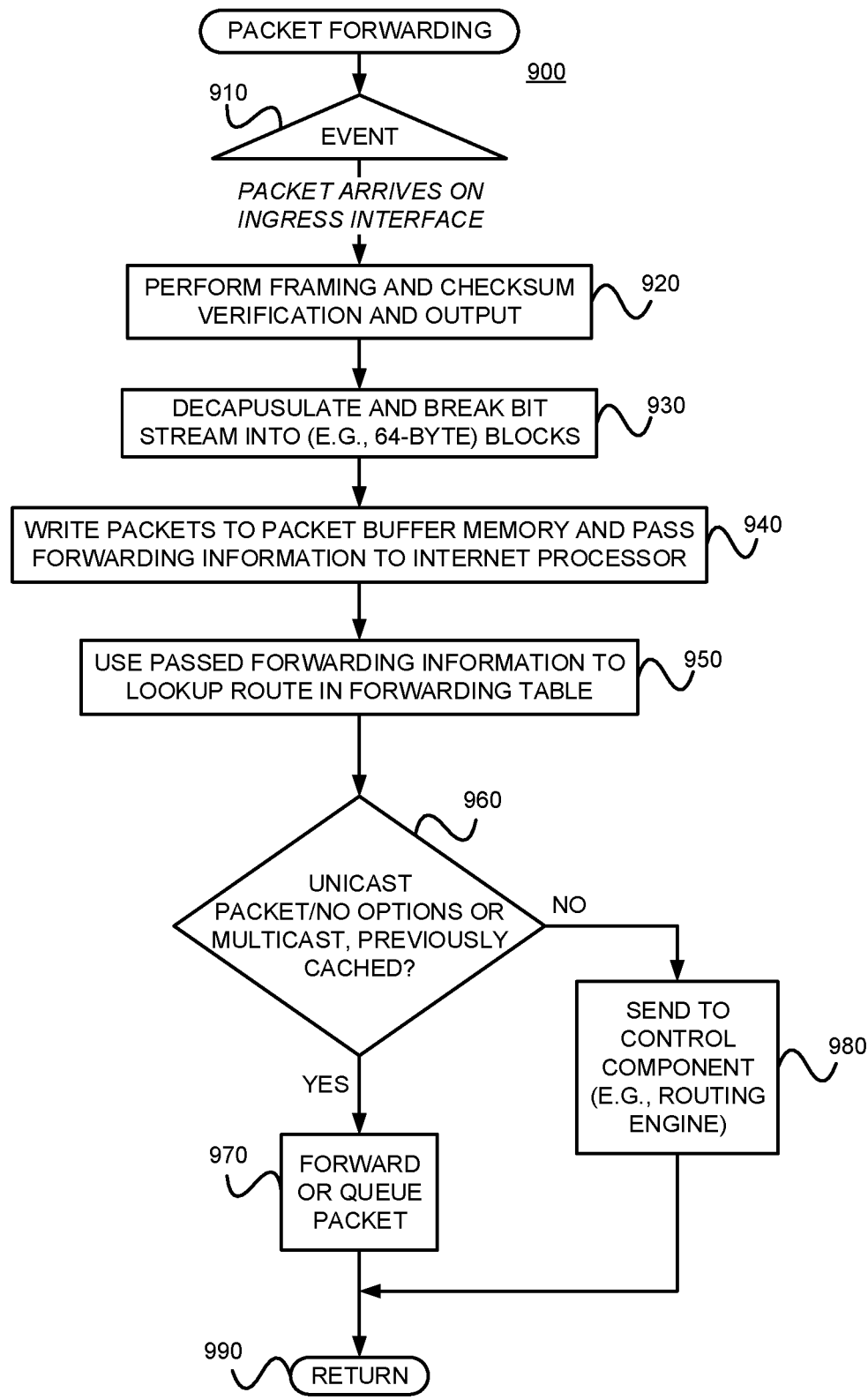
FIG. 9 is a flow diagram of an example method for providing packet forwarding in an example router.

FIG. 9 is a flow diagram of an example method 900 for providing packet forwarding in the example router. The main acts of the method 900 are triggered when a packet is received on an ingress (incoming) port or interface. (Event 910) The types of checksum and frame checks that are required by the type of medium it serves are performed and the packet is output, as a serial bit stream. (Block 920) The packet is then decapsulated and parsed into (e.g., 64-byte) blocks. (Block 930) The packets are written to buffer memory and the forwarding information is passed on the Internet processor. (Block 940) The passed forwarding information is then used to lookup a route in the forwarding table. (Block 950) Note that the forwarding table can typically handle unicast packets that do not have options (e.g., accounting) set, and multicast packets for which it already has a cached entry. Thus, if it is determined that these conditions are met (YES branch of Decision 960), the packet forwarding component finds the next hop and egress interface, and the packet is forwarded (or queued for forwarding) to the next hop via the egress interface (Block 970) before the method 900 is left (Node 990) Otherwise, if these conditions are not met (NO branch of Decision 960), the forwarding information is sent to the control component 610 for advanced forwarding resolution (Block 980) before the method 900 is left (Node 990).

Referring back to block 970, the packet may be queued. Actually, as stated earlier with reference to FIG. 7, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 722 may send a request for the packet to the second DBM ASIC 735b. The DBM ASIC 735 reads the blocks from shared memory and sends them to the I/O manager ASIC 722 on the FPC 720, which then serializes the bits and sends them to the media-specific ASIC of the egress interface. The I/O manager ASIC 715 on the egress PIC 710 may apply the physical-layer framing, perform the CRC, and send the bit stream out over the link.

Referring back to block 980 of FIG. 9, as well as FIG. 7, regarding the transfer of control and exception packets, the system control board 740 handles nearly all exception packets. For example, the system control board 740 may pass exception packets to the control component 610.

Although example embodiments consistent with the present invention may be implemented on the example routers of FIG. 5 or 6, embodiments consistent with the present invention may be implemented on communications network nodes (e.g., routers, switches, etc.) having different architectures. More generally, embodiments consistent with the present invention may be implemented on an example system 1000 as illustrated on FIG. 10.

Figure 10:
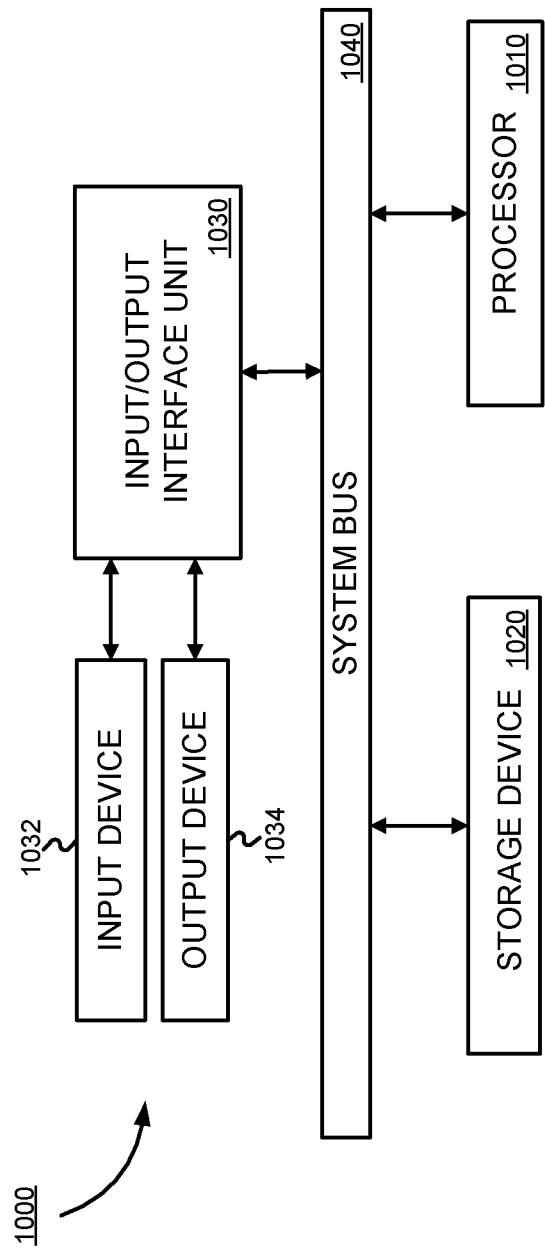
FIG. 10 is a block diagram of an exemplary machine that may perform one or more of the processes described, and/or store information used and/or generated by such processes.

FIG. 10 is a block diagram of an exemplary machine 1000 that may perform one or more of the processes described, and/or store information used and/or generated by such processes. The exemplary machine 1000 includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Linux operating system) to effect one or more aspects of the present invention. At least a portion of the machine-executable instructions may be stored (temporarily or more permanently) on the one or more storage devices 1020 and/or may be received from an external source via one or more input interface units 1030. The machine-executable instructions may be stored as various software modules, each module performing one or more operations. Functional software modules are examples of components of the present description.

In some embodiments consistent with the present description, the processor 1010 may be one or more microprocessors and/or ASICs. The bus 1040 may include a system bus. The storage device 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present invention (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a server (e.g., a software defined network controller), a tablet computer, a mobile phone, or any device that has computing and networking capabilities.

§ 4.4 Example Illustrating Operations of an Example Method

Figure 11:
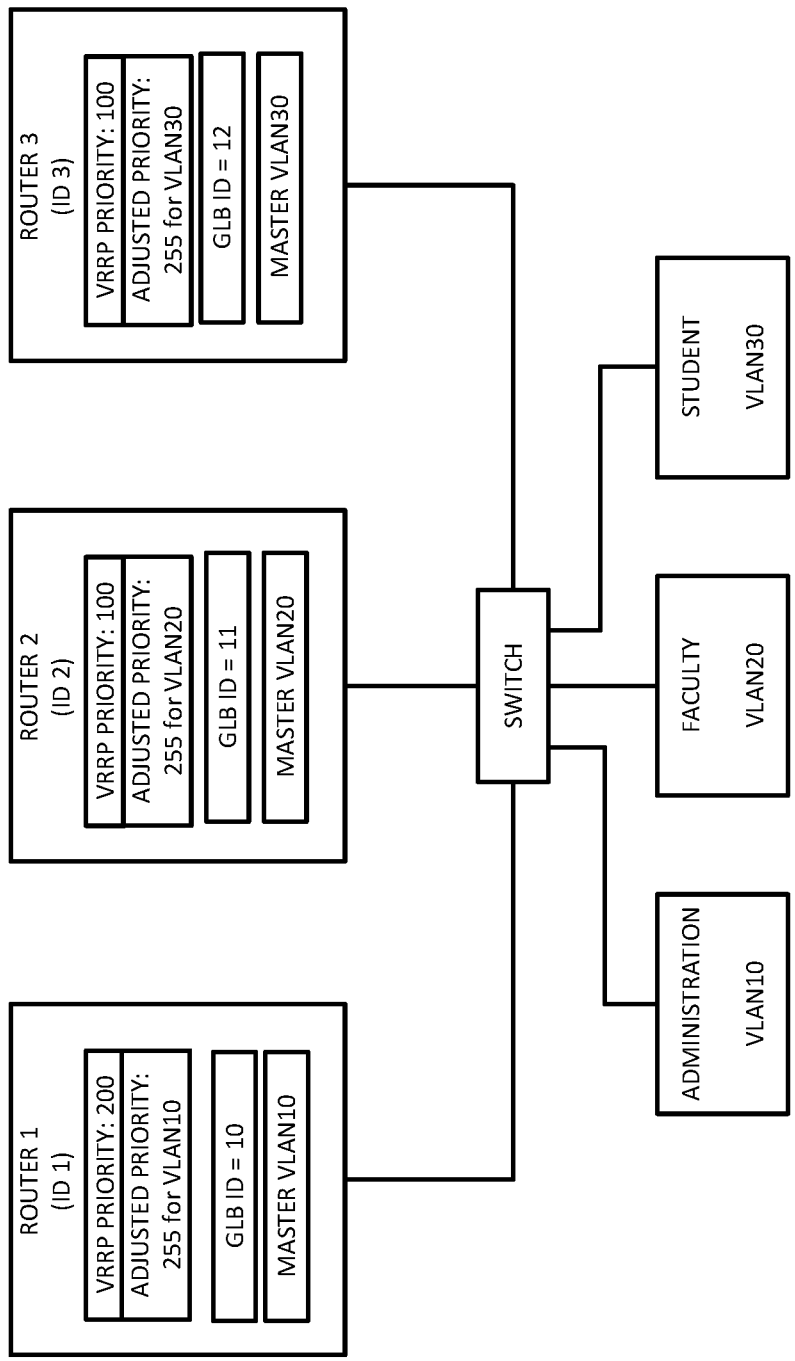
FIG. 11 is an example network used to illustrate an example of operations of the example method 300 of FIG. 3.

FIG. 11 is an example network used to illustrate an example of operations of the example method 300 of FIG. 3. Routers 1-3 are peers running a VRRP on a LAN. Suppose that router 1 is configured with an initial VRRP priority of 200 and a GBL_ID of 10, router 2 is configured with an initial VRRP priority of 100 and a GBL_ID of 20, and router 3 is configured with an initial VRRP priority of 100 and a GBL_ID of 30. After exchanging VRRP packets, such as the one 400 illustrated in FIG. 4, assume that router 1, running a selection procedure, selects itself as the Master for VLAN 10, but not for VLAN 20 or VLAN 30. Assume further that router 2, running a selection procedure, selects itself as the Master for VLAN 20, but not for VLAN 10 or VLAN 20. Finally, assume that router 3, running a selection procedure, selects itself as the Master for VLAN 30, but not for VLAN 10 or VLAN 20. Consequently, router 1 adjusts its priority value for VLAN 10 to 255 and advertises it. (Recall, e.g., blocks 360 and 370 of FIG. 3.) Similarly, router 2 adjusts its priority value for VLAN 20 to 255 and advertises it, and router 3 adjusts its priority value for VLAN 30 to 255 and advertises it.

Figure 1:
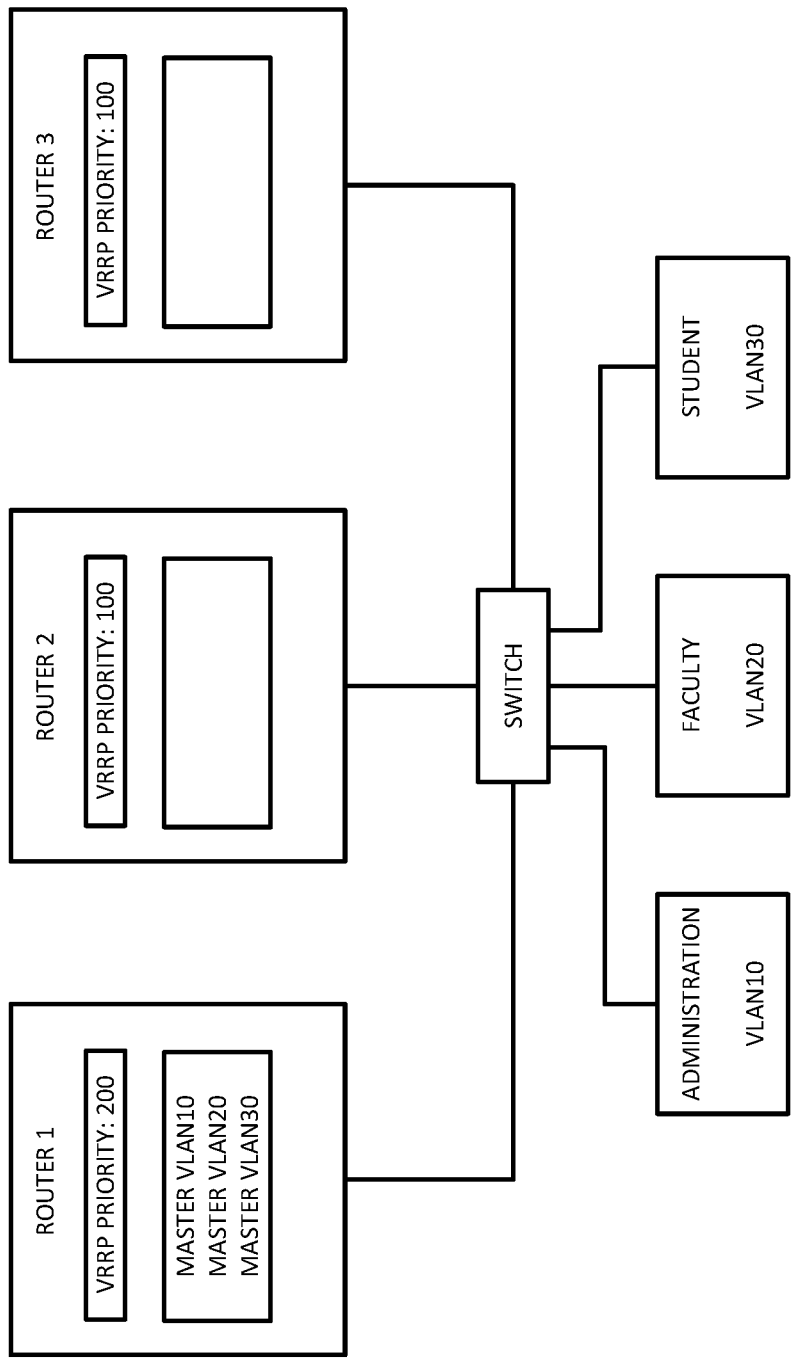
FIG. 1 is an example network used to illustrate existing VRRPv3.
Figure 2:
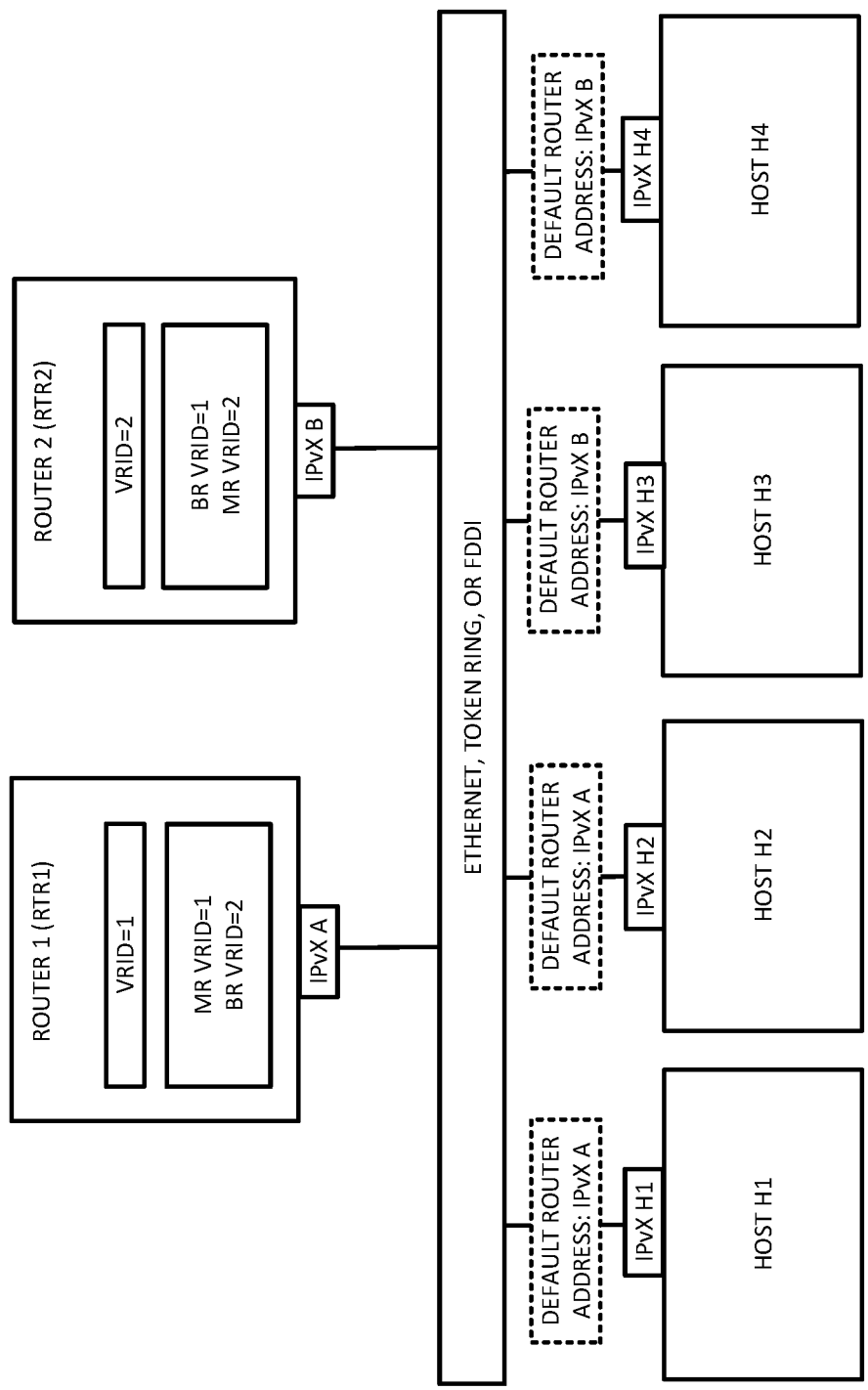
FIG. 2 is an example network used to illustrate statically configured load balancing, consistent with RFC 5798.

Comparing FIG. 11 to FIG. 1, rather than having router 1 being the Master for all of VLAN 10, VLAN 20 and VLAN 30, and consequently handling all of the traffic of these three VLANs as in FIG. 1, using an example method consistent with FIG. 11, router 1 is the Master for VLAN 10, router 2 is the Master for VLAN 20 and router 3 is the Master for VLAN 30, thereby distributing the traffic load from the three VLANs across the three routers.

§ 4.5 Refinements, Alternatives and Extensions

Referring back to block 440, the master for the identified VRRP group may be selected using a previously specified selection process. In one example, the priority value (e.g., carried in field 450 of example message 400) may be adjusted on a per VLAN basis. As one example, assume that there are two routers and 20 VLANs. A first router might be the master for the even numbered VLANs (e.g., by adjusting its priority value to a maximum value for such VLANs), while the second router might be the master for the odd numbered VLANs (e.g., by adjusting its priority value to a maximum value for such VLANs). As a second example, router may be selected as the master for a VLAN on a round robin basis (e.g., by adjusting its priority value to a maximum value for every $n^{th}$ VLANs, assuming there are n routers).

Still referring to block 440, this local Master selection process may be performed each time a new VRRP router comes online, and/or each time a VRRP router leaves.

§ 4.6 Conclusions

As should be appreciated from the foregoing, example embodiments consistent with the foregoing description may use VRRPv3, as proposed in RFC5798, to achieve automatic group load balancing among the IPv4 and IPv6 VRRP routers without any planning or manual configuration.

What is claimed is:

1. A computer-implemented method comprising:
    a) receiving, by a virtual router redundancy protocol (VRRP) router on a local area network (LAN), a group load balancing identifier (GLB ID) value to be associated with the VRRP router;
    b) sending, by the VRRP router, the GLB ID value to at least one peer VRRP router on the LAN, the VRRP router and the at least one peer VRRP router on the LAN defining a group of peer VRRP routers;
    c) receiving, by the VRRP router, a second GLB ID value from a peer VRRP router on the LAN, the second GLB ID value being associated with the peer VRRP router;
    d) selecting, for each of at least two virtual local area networks (VLANs), and using the GLB ID value and the second GLB ID value, a master for the group of peer VRRP routers; and
    e) responsive to the VRRP router selecting itself as the master for the group of VRRP routers for a given one of the at least two VLANs, 1) adjusting, by the VRRP router, a priority value of the VRRP router for the group of VRRP routers for the given one of the at least two VLANs, and
2) sending, by the VRRP router, a notification to the at least one VRRP peer device, that the VRRP router is the master for the group of VRRP routers for the given one of the at least two VLANs.

2. The computer-implemented method of claim 1, wherein the GLB ID is a value between 1 and 15.

3. The computer-implemented method of claim 1, wherein the GLB ID is sent in a VRRPv3 formatted packet.

4. The computer-implemented method of claim 3, wherein the GLB ID is represented by bits in the RSVD field of the VRRPv3 formatted packet.

5. The computer-implemented method of claim 1, wherein the act of adjusting, by the VRRP router, a priority value of the VRRP router for the group of VRRP routers for the given one of the at least two VLANs, includes increasing the priority value for the given one of the at least two VLANs.

6. The computer-implemented method of claim 1, wherein the act of adjusting, by the VRRP router, a priority value of the VRRP router for the group of VRRP routers for the given one of the at least two VLANs, includes increasing the priority value for the given one of the at least two VLANs to a maximum value.

7. A virtual router redundancy protocol (VRRP) router for provision on a local area network (LAN), the VRRP router comprising:
a) at least one processor; and
b) a non-transitory storage medium storing processor-executable instructions which, when executed by the at least one processor, cause the at least one processor to perform a method including
1) receiving, by the VRRP router on the local area network (LAN), a group load balancing identifier (GLB ID) value to be associated with the VRRP router,
2) sending, by the VRRP router, the GLB ID value to at least one peer VRRP router on the LAN, the VRRP router and the at least one peer VRRP router on the LAN defining a group of peer VRRP routers,
3) receiving, by the VRRP router, a second GLB ID value from a peer VRRP router on the LAN, the second GLB ID value being associated with the peer VRRP router,
4) selecting, for each of at least two virtual local area networks (VLANs), and using the GLB ID value and the second GLB ID value, a master for the group of peer VRRP routers, and
5) responsive to the VRRP router selecting itself as the master for the group of VRRP routers for a given one of the at least two VLANs,
adjusting, by the VRRP router, a priority value of the VRRP router for the group of VRRP routers for the given one of the at least two VLANs, and
sending, by the VRRP router, a notification to the at least one VRRP peer device, that the VRRP router is the master for the group of VRRP routers for the given one of the at least two VLANs.

8. The VRRP router of claim 7, wherein the GLB ID is a value between 1 and 15.

9. The VRRP router of claim 7, wherein the GLB ID is sent in a VRRPv3 formatted packet.

10. The VRRP router of claim 9, wherein the GLB ID is represented by bits in the RSVD field of the VRRPv3 formatted packet.

11. The VRRP router of claim 7, wherein the act of adjusting, by the VRRP router, a priority value of the VRRP router for the group of VRRP routers for the given one of the at least two VLANs, includes increasing the priority value for the given one of the at least two VLANs.

12. The VRRP router of claim 7, wherein the act of adjusting, by the VRRP router, a priority value of the VRRP router for the group of VRRP routers for the given one of the at least two VLANs, includes increasing the priority value to a maximum value for the given one of the at least two VLANs.

13. A non-transitory storage medium storing processor-executable instructions which, when executed by at least one processor of a virtual router redundancy protocol (VRRP) router on a local area network (LAN), cause the at least one processor to perform a method including
a) receiving, by the VRRP router on the local area network (LAN), a group load balancing identifier (GLB ID) value to be associated with the VRRP router,
b) sending, by the VRRP router, the GLB ID value to at least one peer VRRP router on the LAN, the VRRP router and the at least one peer VRRP router on the LAN defining a group of peer VRRP routers,
c) receiving, by the VRRP router, a second GLB ID value from a peer VRRP router on the LAN, the second GLB ID value being associated with the peer VRRP router,
d) selecting, for each of at least two virtual local area networks (VLNs), and using the GLB ID value and the second GLB ID value, a master for the group of peer VRRP routers, and
e) responsive to the VRRP router selecting itself as the master for the group of VRRP routers for a given one of the at least two VLANs,
adjusting, by the VRRP router, a priority value of the VRRP router for the group of VRRP routers for the given one of the at least two VLANs, and
sending, by the VRRP router, a notification to the at least one VRRP peer device, that the VRRP router is the master for the group of VRRP routers for the given one of the at least two VLANs.

14. The non-transitory storage medium of claim 13, wherein the GLB ID is a value between 1 and 15.

15. The non-transitory storage medium of claim 13, wherein the GLB ID is sent in a VRRPv3 formatted packet.

16. The non-transitory storage medium of claim 15, wherein the GLB ID is represented by bits in the RSVD field of the VRRPv3 formatted packet.

17. The non-transitory storage medium of claim 13, wherein the act of adjusting, by the VRRP router, a priority value of the VRRP router for the group of VRRP routers for the given one of the at least two VLANs, includes increasing the priority value for the given one of the at least two VLANs.

18. The non-transitory storage medium of claim 13, wherein the act of adjusting, by the VRRP router, a priority value of the VRRP router for the group of VRRP routers for the given one of the at least two VLANs, includes increasing the priority value to a maximum value for the given one of the at least two VLANs.

* * * * *